United States Patent Office 3,490,231
Patented Jan. 20, 1970

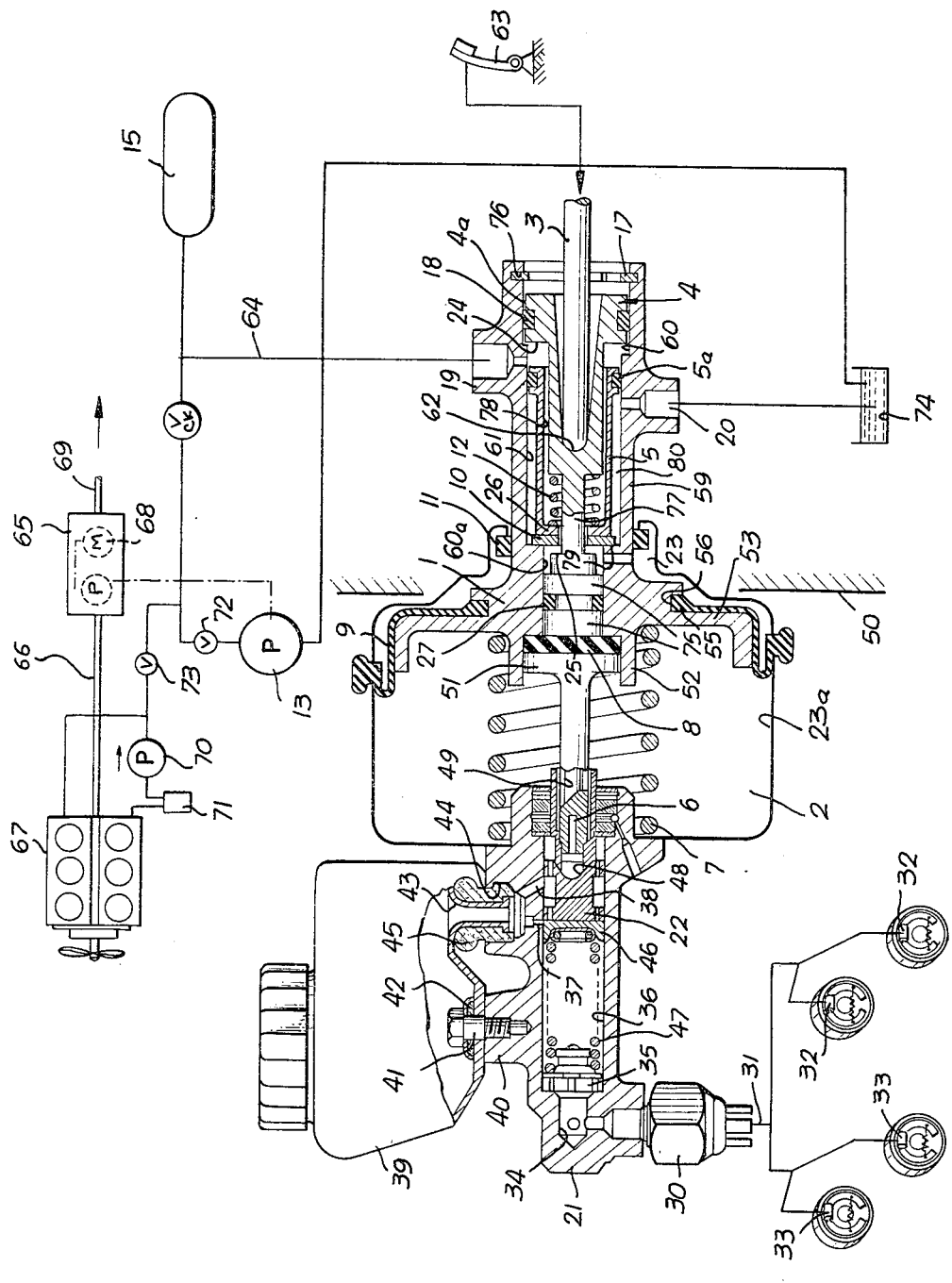

3,490,231
POWER BRAKE FOR AUTOMOTIVE VEHICLE
Hans-Christof Klein, Hattersheim (Main), Germany, assignor to Alfred Teves GmbH, Frankfurt am Main, Germany, a corporation of Germany
Filed Jan. 8, 1968, Ser. No. 696,350
Claims priority, application Germany, Jan. 20, 1967,
T 33,026
Int. Cl. F15b 7/08, 7/00, 15/18
U.S. Cl. 60—54.5                                  8 Claims

ABSTRACT OF THE DISCLOSURE

A power brake for an automotive vehicle in which a power cylinder is chargeable with a hydraulic fluid to sustain a pressure differential tending to drive the master-cylinder piston in the brake-operating direction under the control of a valve operated by the brake pedal, the fluid source being constituted by a hydraulic pump (e.g. the hydraulic pump of a power-steering system, of an automatic transmission or torque converter) via a pressure accumulator which, upon depression of the brake pedal, is connected with the power chamber of the device but normally hydraulically biases the actuating rod against brake-actuating pressure on the brake pedal.

My present invention relates to a vehicle power-brake system in which a power cylinder is chargeable with a hydraulic fluid to apply a fluid-pressure differential in the brake-operating direction to the master-cylinder piston of a vehicular brake under the control of the brake pedal and, more particularly, to a device of that general character with improved control means and elevated brake-operating force.

Pneumatic or hydraulic/vacuum power-assist brake systems have been provided heretofore which generally comprise a relatively large-diameter power cylinder containing a correspondingly dimensioned power piston which subdivides the cylinders into a pair of working chambers in which a fluid-pressure differential is sustained by a manifold vacuum connection to the chamber ahead of the piston in the direction of its actuating movement while compressed air pressure or ambient atmospheric pressure is sustained in the chamber behind the piston. Control of the pressure differential is effected by a valve structure generally mounted on or in the body of the main piston and coupled with the brake pedal so as to transmit to the latter a feedback force permitting the operator to sense the degree of brake operation. Such systems are limited by the subatmospheric pressure which is generated by the engine and by the diameter of the power-assist cylinder, the added or "assisting" force being proportional to the product of the surface area of the assist piston and the pressure differential thereacross. The pressure differential varies with engine conditions although, because of the design of the engines, it can never exceed a characteristic relatively low level. As a result of the aforedescribed relationship, the power-assist cylinder and piston must have a relatively large diameter to generate any significant assist force. Furthermore, the systems are sensitive to leaks in the vacuum connections and are characterized by a relatively poor augmentation of the foot force applied to the brake pedal.

It is, therefore, the principal object of the present invention to provide an improved power-assist device for a vehicular brake system.

I have found that it is possible to obtain an increase in the brake force delivered by a power-assist assembly for a vehicular brake system without substantially increasing the costs of the system or the diameter of the power drum or cylinder, or to permit a much smaller power-assist drum to be used at the same assisting force by providing an arrangement which includes a control member connected between a hydraulic pump and pressure accumulator system and a hydraulic reservoir. More specifically, I have discovered that it is possible to decrease the diameter of the power-assist drum without detriment to the braking characteristics or to increase the brake force for a given drum diameter, by making use of hydraulic networks commonly available in automotive vehicles and a novel arrangement whereby the power-assist device does not make such demands on the hydraulic system as to warrant redimensioning or replacement thereof. Thus, the hydraulic pressure of any hydraulic network or pump in the automotive vehicle may be used. Such pumps include the servo pumps of power-steering or gear-shifting arrangements, hydraulic pumps used for operating or auxiliary equipment such as automatic tail gates, the hydrostatic or hydrodynamic pumps of hydraulic gear-change or speed-varying transmissions, hydrodynamic or hydrostatic pumps used in torque converters or for hydrodynamic brakes, and even the lubricating pumps of an automotive vehicle engine; in short, any liquid pump capable of sustaining a hydraulic pressure and commonly used in automotive vehicles may be employed.

According to a specific feature of this invention, the power-assist system comprises, in addition to the aforementioned pump, a spring or gas-loaded pressure accumulator which is connected with the pump via a check valve and is, in turn, connected to the power-assist cylinder while having a liquid volume or capacity at least equal to the volume requirement of the power cylinder. Thus the device comprises a power-assist cylinder in the form of a drum whose interior is subdivided axially into a pair of chambers by a relatively large-diameter piston which may be connected to the wall of the drum by a flexible membrane. The piston is, in turn, coupled with the master cylinder piston of a conventional master cylinder which is hydraulically connected with the wheel-brake cylinder in the usual manner.

More specifically, the power-brake system comprises a power piston with a large-diameter disk portion subdividing the power cylinder drum into a pair of chambers, one of which can be supplied with liquid under pressure from any of the liquid pumps of the vehicle, i.e. a lubricating-oil circulating pump of the engine, a transmission pump for servocontrol of the movable elements of the transmission or forming part of a torque converter (e.g. a pump coupled with the vehicle shaft and forming a hydraulic circuit with a motor connected to the driven wheels, a pump for the hydraulic control circuits (e.g. steering) of the vehicle or the like. The pump advantageously feeds a pressure accumulator via a check valve, this network being connected with a control cylinder formed in the interior of the power piston and receiving a control piston having a relatively small-diameter surface and a relatively large-diameter surface axially spaced in the control cylinder on opposite sides of the inlet whereby the liquid pressure differentially biases the control piston in a brake deactivating direction. A control sleeve, biased relatively to the control piston in the opposite direction by a spring or the liquid pressure, forms a sealing shoulder (advantageously carrying a rubber washer) which can engage a valve seat of the power piston when the control piston is shifted by the brake pedal in brake actuating direction, thereby closing communication between the working chamber of the power cylinder and the reservoir via an annular clearance surrounding this sleeve. In this condition, the liquid is admitted via a clearance between the sleeve and the control piston to the working chamber of the power cylinder. When the brake pedal is released, however, an oppositely facing shoulder of the control piston, now biased by the liquid differential in the opposite direction, engages the shoulder of the sleeve to lift the latter from the valve seat and permit draining of the power cylinder.

The above and other objects, features and advantages of the present invention will become more readily apparent from the following description, reference being made to the accompanying drawing, the sole figure of which is a somewhat diagrammatic view, partially in axial section, of a power brake for an automotive vehicle.

In the drawing, I show a power-brake system in which the usual master cylinder 21 is connected via a fitting 30 with the brake-fluid transmission network 31 supplying the wheel-brake cylinders represented at 32 and 33. In this case, only a single master-cylinder chamber supplies all of the wheel brakes although it is equally possible to make use of a tandem-master cylinder for supplying the wheel-brake cylinders in sets thereby increasing the safety of the device. The master cylinder 21 is provided at its outlet 34 with the foot-type two-way check valve 35 of conventional construction. The cylinder bore 36 of the master cylinder has a bypass port 37 and a fluid-intake port 38 which deliver brake fluid from a reservoir 39 which is mounted upon a pedestal 40 by a screw 41 and a seal 42 providing the escape of fluid from the reservoir. A spigot 43 extends from the brake-fluid reservoir 39 into the inlet port 44 of the master cylinder where it is sealed by a packing 45. Within the bore 36, the master-cylinder piston 22 is axially shiftable and carries the primary cup 46 which bears against the return spring 47 resisting displacement of the piston 22. The latter is formed with a socket 48 receiving the head of a force-transmitting member 6 which extends into the sleeve portion 49 in the right-hand end of piston 22. Thus, when the piston 22 is shifted to the right, it displaces brake fluid in the usual manner to the wheel-brake cylinders 32 and 33 during the brake application step.

The power unit comprises a drum 2 which is affixed to a portion of the vehicle chassis 50 and receives a power piston 1 adapted to shift the force-transmitting member 6, whose head 51 is received in an axially extending boss 52 of the power piston 1, via a resiliently compressible body 8 whose response-feedback function is described in the commonly assigned copending application Ser. No. 657,619, filed Aug. 1, 1967 by Franz Pech and Peter Spahn. A spring 7 coaxially surrounds the force-transmitting member 6 and the boss 52 and urges the power piston 1 into its right-hand position illustrated in the drawing. At its left-hand end, the spring 7 bears upon the far face of the drum 2. The disk portion 53 of the piston approaches the cylindrical peripheral wall of the drum 2 and is sealed with respect thereto by a roll-type membrane 9 whose outer periphery is a bead lodged in the cylinder housing 2 and whose inner peripheral bead 58 hugs the piston 1 while being seated in a groove 56 thereof.

The power piston 1 has a cylindrical portion 59 extending axially outwardly from the housing 2 and sealed with respect to the latter by a sealing ring 11. The sleeve portion 59, which is open to the right, slidably receives a force-transmitting control piston 4 whose annular seal 18 slidably engages the large-diameter step 60 of the cylinder bore 61 formed by sleeve 59. An axially open socket 62 is provided in the control piston 4 and receives an actuating member 3, in the form of a rod which is displaced to the left by the brake pedal 63 of the vehicle when the brake is to be applied. The cylinder sleeve 59 is provided with a fitting 19 forming an inlet port which admits hydraulic fluid into the bore 61 ahead of the large-diameter step 4a of control piston 4, the pressure of this fluid acting against an annular surface 24 as will be apparent hereinafter. Fluid is delivered to the inlet 19 by a flexible transmission line 64 coupled with a hydraulic network including a pump 13 which is here shown to be the pump of a hydraulic transmission illustrated in diagrammatic form at 65. In this transmission, which may be of the torque-converter, hydromatic, hydrostatic or other fluid-controlled type, in which a pump driven by the engine shaft has its output connected to a hydraulic motor while planetary gears or the like select the speed, the pump system can have any of the configurations represented at pages 291 ff. of Principles of Automotive Vehicles, U.S. Government Printing Office, Washington, D.C., 1956. In the diagrammatic illustration of the drawing, the pump 13 is driven by the output shaft 66 of the vehicle engine 67 while the motor 68 drives the output shaft 69 which is conected, via the usual power-transmission shaft, universal joints, etc. with the wheel drive, differential, etc. An alternative arrangement makes use of the pump 70 which circulates oil to the moving parts of the engine 67, e.g. via a filter 71. Valves 72 and 73 may be used to choose between the oil or hydraulic pressure pump. It will be understood, however, that the principles of the present invention provide that any of the hydraulic pressure (liquid-displacement) pumps used in an automotive vehicle may be employed for the present purpose, such pumps including hydraulic pumps for operating power take-off arrangements, hydraulic tail gates, crane structures and jacks, hydraulic pumps for power steering and the control of other powered portions of the vehicle and even hydraulic pumps which may be used to operate hydraulic motors driving the wheels of the vehicle directly. The pump 70 may likewise represent any lubricating pump which may be provided to supply oil under pressure to operative parts of the vehicle whether these parts are built into the units with which they are associated or are ancillary thereto.

According to the principles of the present invention, between the pump 13 or 70 and a pressure accumulator 15, the line 64 is connected, preferably with a check valve 14 interposed between the pump and the line 64. The pressure accumulator may be of the type described on pages 86 ff. of Fluid Power, U.S. Government Printing Office, 1966. An outlet 20 is connected via a flexible line 16 with a reservoir 74 supplying the pump 13 or forming a return in the oil-circulating network of pump 70 as is required.

The piston 4 extends substantially the full length of the center bore 61 of the cylinder sleeve 59 and has a small-diameter head 75 bearing against the cushion 8 and sealed via a ring 27 within the small-diameter step 60a of the bore. Between the large-diameter step 60 and the small-diameter step 60a, the piston 4 defines an all-around clearance with the wall of the bore 61 and the cylinder sleeve 59. The return stroke of piston 4 is limited by a split abutment ring 17 which has been snapped into a groove 76 at the right-hand end of the cylinder sleeve 59.

In the annular clearance surounding the control piston 4, between the heads 4a and 75, I provide a control sleeve 5 which is axially shiftable in the bore 61 but is urged to the left by a compression spring 12 surrounding a narrow-diameter shank 77 of the piston 4. The spring 12 thus urges the sleeve 5 and the piston 4 in opposite directions. A seal 5a at the end of sleeve 5 proximal to the inlet 19 engages the wall 61 of the cylinder sleeve 59, the outlet 20 being provided ahead of the seal 5a in the direction of actuation of the brake. Between the sleeve 5 and the portion of the piston 4 surrounded thereby, I provide an additional clearance 78 which extends from the inlet 19 to a valve seat 79 which co-operates with an annular sealing ring 10 forming a valve member. The sealing ring 10 may be held, in one condition, against the seat 79 to prevent flow of fluid from the inlet 19 to the outlet 20 via annular clearances 78 and 80 respectively inwardly and outwardly of the sleeve 5, all with the shoulder 25 of the small-diameter head 75 of piston 4 which prevents flow of the fluid into a working chamber 23 of the power cylinder 2. The membrane 9 and piston disk 53 subdivide the power cylinder 2 into a pair of chambers 23 and 23a, the latter of which may be under vacuum or may be vented to the atmosphere. Chamber 23, when supplied with fluid under pressure, applies a force to the piston 1 which is proportional to the surface area of the disk 53 and the pressure within the chamber to add this force to the foot pressure which is applied to the master cylinder piston 22 via rod 3, control piston 4, semi-rigid cushion 8 and force-transmitting pin 6. When the piston 4 is shifted to the right, shoulder 25 is designed to lift the washer 10 from the valve seat 79 and permit a return flow of the hydraulic fluid from chamber 23 to the reservoir 74 via the compartment 80. As piston 4 is forced to the left, however, the shoulder 26 of the control sleeve 5 is yieldably urged to the left by spring 12 to retain the ring 10 (which is carried by the washer 26) against the seat 79.

Prior to the actuation of the brake pedal, a hydraulic pressure is developed at inlet 19 and is applied to the surface 24 whose area exceeds that of the small-diameter head 75 so that the piston 4 is held in its right-hand position against the ring 17. In this position, the fluid in the annular clearance 78 urges (in conjunction with spring 12) the sleeve 5 to the left while shoulder 25 is drawn to the right and sealingly engages the washer 10 to prevent fluid flow between inlet 19 and outlet 20 and permit buildup of pressure in accomulator 15. It is immaterial that the pressure within the accumulator may build up to high values since, the higher the pressure, the greater is the force urging piston 4 to the right and shoulder 25 against washer 10. Hydraulic fluid cannot pass from inlet 19 into chamber 23 which is connected via line 80 to the outlet 20 to ensure that no pressure appears in chamber 23. Spring 7 retains the power piston 1 in its right-hand position unresisted by a hydraulic counterpressure in chamber 23. There being no pressure to the left, spring 47 of the master cylinder 21 can hold the piston 22 thereof in a right-hand extreme position. The wheel-brake cylinders 32 and 33 are thus depressurized. During the normal operation of the vehicle, pump 70 or 13 generates the pressure which is built up in the respective accumulator (represented at 15).

When the brake pedal 63 is depressed, the force-transmitting rod 3 is shifted to the left (arrow A in the drawing), to displace the piston 4 to the left. To the extent that the spring 12 and the fluid within the cylinder sleeve 59 resists such movement, a force to the left is applied directly to the power piston 1 which is displaced against the spring 7 to actuate the piston 22 with a limited foot-pressure force reduced by the force of springs 7 and 47. The movement of the control piston 4, however, lifts the shoulder 25 away from the washer 10 which, upon such movement, engages the seat 79 thereby blocking hydraulic communication between inlet 19 and outlet 20 but permitting fluid from inlet 19 and under the pressure of accumulator 15 to a working chamber 23 of power cylinder 2. With the augmented force of this fluid as applied to the disk 53, the power piston 1 moves to the left to assist the foot-pressure-displacing piston 22. Brake fluid is forced from bore 36 past the check valve 35 and through the transmission network 31 to the wheel-brake cylinders 32 and 33. Simultaneously, the engagement of washer 10 to the seat 79 blocks communication with outlet 20 and reservoir 74. The piston 1 applies its force to the master-cylinder piston 22 via the semi-rigid cushion 8 and the force-transmitting rod 6. Thus, as noted in the aforementioned copending application, the reaction force to the right, when brake application has commenced, is transmitted via the limitedly compressible body 8 to the control piston 4 and the rod 3 to the brake pedal. The vehicle operator is thus able to sense the braking effectiveness and maintain complete control over brake operation.

When the brake pedal 63 is released, spring 7 urges the piston 1 to the right while spring 12 displaced the control piston 4 in this direction as well. Shoulder 25 engages the washer 10 and lifts the latter, under the differential force generated because of the difference in area of the surfaces 24 and 25, away from the seat 79 and to the right. A passage is thus opened between chamber 23 and the outlet 20, while the pressure at inlet 19 again retains the control piston 4 and the rod 3 in their extreme right-hand positions. Spring 7 applies a force to piston 1 which expels fluid from chamber 23 to the reservoir. During this period, spring 12 ensures that the shoulders 25 and 26 will simultaneously bear upon the washer 10 to prevent hydraulic fluid from again entering the chamber 23.

I claim:
1. A brake system for an automotive vehicle having a liquid reservoir and a pump adapted to deliver liquid under pressure, said system comprising:
   at least one wheel-brake cylinder;
   a brake master cylinder having a master-cylinder piston shiftable to express fluid from said master cylinder and to activate said wheel-brake cylinder;
   a power cylinder;
   a power piston shiftable in said power cylinder and operatively connected with the piston of said master cylinder for displacing same;
   a control cylinder connected with said pump for receiving liquid under pressure;
   valve means including:
      a control piston in said control cylinder for regulating delivery of said liquid to said power cylinder;
      a control sleeve coaxially surrounding said control piston with clearance,
      a pair of valve shoulders formed on said control sleeve and on said control piston and mutually engageable in an unactuated state of the brake system for blocking flow of said liquid from said control cylinder to said power cylinder while permitting flow of the liquid from said power cylinder to said liquid reservoir, and
      spring means acting upon said control sleeve and said control piston in opposite directions to maintain said shoulders in sealing engagement; and
   actuating means controlled by the vehicle operator for shifting said control piston said control piston having a pair of effective surfaces exposed to the pressure of said liquid in said control cylinder and together applying a differential force in one direction, said actuating means shifting said control piston in the opposite direction for operating said valve means to supply said liquid to said power cylinder.

2. The brake system defined in claim 1, further comprising:
   a pressure accumulator connected with said pump;
   a check valve connected between said pump and said accumulator; and
   means connecting said control cylinder with said pump between said check valve and said accumulator.

3. The brake system defined in claim 1 wherein:
   said control cylinder is formed in said power piston and has an inlet for said liquid communicating with said annular clearance; said surfaces of said control piston include a relatively small surface exposed to said liquid under pressure and effective in said other direction, and a relatively large surface exposed to said liquid and effective in said one direction;
   said shoulder of said control piston faces in said one direction;
   said sleeve defines with said control cylinder an annular clearannce communicating with said reservoir; and
   said power piston is formed with a valve seat between said power cylinder and said clearances and sealingly engageable by said shoulder of said sleeve.

4. The brake system defined in claim 3 wherein said shoulder of said sleeve is provided with a sealing washer.

5. The brake system defined in claim 1 wherein said pump is a lubricating-oil circulating pump.

6. The brake system defined in claim 1 wherein said pump is a hydraulic pump connected in a control network of the vehicle.

7. The brake system defined in claim 6 wherein said control network is a power-steering system of the vehicle.

8. The brake system defined in claim 1, further comprising force-transmitting means including a semirigid body between the master-cylinder piston and said power piston, said control piston bearing upon said body.

References Cited

UNITED STATES PATENTS

| | | |
|---|---|---|
| 2,343,698 | 3/1944 | Parnell. |
| 2,840,044 | 6/1958 | Carrion. |
| 2,902,829 | 9/1959 | Verbrugge. |
| 2,908,137 | 10/1959 | Spalding et al. _____ 60—51 |
| 2,964,909 | 12/1960 | Garrison. |
| 3,054,386 | 9/1962 | Bohnhoff. |
| 3,064,431 | 11/1962 | Schnell. |
| 3,159,974 | 12/1964 | Rodgers. |
| 3,345,817 | 10/1967 | Randol. |
| 3,353,451 | 11/1967 | Garrison et al. |

MARTIN P. SCHWADRON, Primary Examiner

R. R. BUNEVICH, Assistant Examiner

U.S. Cl. X.R.

60—52, 54.6